United States Patent
Barnes et al.

(10) Patent No.: US 11,946,876 B2
(45) Date of Patent: Apr. 2, 2024

(54) SYSTEMS AND METHODS FOR HONEYCOMB BODY INSPECTION

(71) Applicant: CORNING INCORPORATED, Corning, NY (US)

(72) Inventors: Joshua Andrew Barnes, Horseheads, NY (US); Russell Wayne Madara, Corning, NY (US); Robert Joseph O'Loughlin, Jr., Big Flats, NY (US); Christie James Suber, Painted Post, NY (US); Eric Daniel Treacy, Beaver Dams, NY (US); Paul Edward Washburn, Newport, VA (US); Michael Yen-Ting Wu, Cambridge, MA (US); Xiaotian Zou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/639,044

(22) PCT Filed: Aug. 6, 2020

(86) PCT No.: PCT/US2020/045112
§ 371 (c)(1),
(2) Date: Feb. 28, 2022

(87) PCT Pub. No.: WO2021/040986
PCT Pub. Date: Mar. 4, 2021

(65) Prior Publication Data
US 2022/0299449 A1   Sep. 22, 2022

Related U.S. Application Data

(60) Provisional application No. 62/893,906, filed on Aug. 30, 2019.

(51) Int. Cl.
*G01N 21/95* (2006.01)
*G01N 21/956* (2006.01)

(52) U.S. Cl.
CPC .............................. *G01N 21/95692* (2013.01)

(58) Field of Classification Search
CPC ........... G01N 15/06; G01N 2015/0846; G01N 21/53; G01N 21/952; G01N 2201/021;
(Continued)

(56) References Cited

U.S. PATENT DOCUMENTS 4,226,539 A * 10/1980 Nakagawa ........... G06G 7/1865
356/73
5,392,359 A    2/1995 Futamura et al.
(Continued)

FOREIGN PATENT DOCUMENTS

CN      109844506 A *  6/2019  ....... G01N 21/95692
DE      202015000233 U1   2/2015
(Continued)

OTHER PUBLICATIONS

International Search Report and Written Opinion of the International Searching Authority; PCT/US2020/045112; dated Oct. 28, 2020, 12 pages; European Patent Office.

*Primary Examiner* — Michael P Stafira
(74) *Attorney, Agent, or Firm* — Russell S. Magaziner

(57) ABSTRACT

Improved inspection techniques are described herein for checking for the presence of and identifying surface defects on a honeycomb body. The improved inspection utilizes measurement of travel of an outer surface of the honeycomb body to collect images of the outer surface. The images are combined into a composite image showing the outer surface of the honeycomb body. The composite image is analyzed to identify surface defects.

20 Claims, 8 Drawing Sheets

(58) Field of Classification Search
CPC ....... G01N 21/9515; G01N 2291/0422; G01N 21/8851; G01N 21/9508; G01N 35/00584; G01N 2015/084; G01N 21/8806; G01N 1/08; G01N 1/38; G01N 1/4055; G01N 1/4077; G01N 2001/4061; G01N 2001/4083; G01N 2001/4088; G01N 2033/245; G01N 2035/00188; G01N 2035/00475; G01N 2035/00495; G01N 2035/00514; G01N 21/05; G01N 21/251; G01N 21/78; G01N 33/24; G01N 35/1004; G01N 35/1095; G01N 2291/0421; G01N 2291/2694; G01N 29/265; G01N 21/95692; G01N 21/9036; G01N 21/91; G01N 2291/0238; G01N 15/08; G01N 2021/845; G01N 2021/8841; G01N 21/90; G01N 29/043; G01N 29/225; G01N 2291/048; G01N 2291/102; G01N 2291/105; G01N 2291/2634; G01N 29/2493; G01N 29/28; G01N 15/082; G01N 21/3581; G01N 21/909; G01N 2201/0633; G01N 2291/103; G01N 2291/106; G01N 29/045; G01N 1/2813; G01N 1/30; G01N 2021/8427; G01N 2021/8472; G01N 2021/9513; G01N 2021/95676; G01N 2035/00752; G01N 21/278; G01N 21/4738; G01N 21/57; G01N 21/8903; G01N 21/9054; G01N 21/93; G01N 2203/0039; G01N 2291/014; G01N 2291/015; G01N 2291/0231; G01N 2291/0423; G01N 23/083; G01N 27/90; G01N 29/11; G01N 29/12; G01N 3/30; G01N 3/34; G01N 33/54366; G01N 35/026; G01N 35/04; G01N 21/8901; G01N 21/8914; G01N 25/72; G01N 29/2481; G01N 29/2487; G01N 35/0099; G01N 15/1484; G01N 2015/0073; G01N 2015/008; G01N 2015/0084; G01N 2015/1486; G01N 2021/556; G01N 2021/646; G01N 2021/6482; G01N 2021/8905; G01N 2021/9518; G01N 2035/00158; G01N 2035/1041; G01N 21/6452; G01N 21/658; G01N 21/69; G01N 21/76; G01N 21/88; G01N 21/892; G01N 21/896; G01N 21/9501; G01N 2201/06146; G01N 2201/063; G01N 2201/0631; G01N 2201/0642; G01N 2201/0813; G01N 2291/0258; G01N 2291/044; G01N 2291/2693; G01N 23/04; G01N 23/043; G01N 23/201; G01N 25/00; G01N 29/00; G01N 29/07; G01N 29/14; G01N 29/223; G01N 29/348; G01N 29/4436; G01N 33/483; G01N 33/487; G01N 33/49; G01N 33/50; G01N 33/5094; G01N 33/543; G01N 33/54386; G01N 33/56966; G01N 33/56972; G01N 33/80; G01N 35/00029; G01N 35/00871; G01N 35/1002; G01N 2001/024; G01N 2021/8812; G01N 2021/8845; G01N 2021/8887; G01N 2021/8908; G01N 21/01; G01N 21/95; G01N 2223/401; G01N 2223/618; G01N 2223/639; G01N 2223/643; G01N 23/00; G01N 23/18; G01N 23/225; G01N 33/025; G01N 33/6872

See application file for complete search history.

(56) References Cited

U.S. PATENT DOCUMENTS

| | | | |
|---|---|---|---|
| 8,090,143 | B2 | 1/2012 | Komaki et al. |
| 8,285,027 | B2 | 10/2012 | Zoeller, III |
| 8,537,215 | B2 | 9/2013 | Booth et al. |
| 9,247,213 | B2 | 1/2016 | Aono |
| 2010/0274525 | A1* | 10/2010 | Zoeller, III ........ G01B 11/2518 356/612 |
| 2011/0128370 | A1* | 6/2011 | Booth ................ G01N 21/952 348/125 |
| 2014/0144211 | A1* | 5/2014 | Blanchard ............ G01N 15/08 73/38 |
| 2017/0336332 | A1* | 11/2017 | Stanford .......... G01N 21/95692 |
| 2017/0365050 | A1* | 12/2017 | Kurahashi ............ G06T 7/0004 |
| 2018/0209904 | A1* | 7/2018 | Itoh ........................ G01N 21/57 |

FOREIGN PATENT DOCUMENTS

| | | | | |
|---|---|---|---|---|
| EP | 1760426 | A1 | 3/2007 | |
| EP | 2128816 | A1 | 12/2009 | |
| EP | 2568279 | A2 * | 3/2013 | .......... A24C 5/3412 |
| EP | 2568279 | A2 | 3/2013 | |
| EP | 3355123 | A1 * | 8/2018 | ............ G01N 21/57 |
| JP | 58-155343 | A | 9/1983 | |
| JP | 08-285780 | A | 11/1996 | |
| JP | 2000-009451 | A | 1/2000 | |
| JP | 2008-185438 | A | 8/2008 | |
| JP | 2009300455 | A * | 12/2009 | ....... G01N 21/95692 |
| JP | 2012103187 | A * | 5/2012 | ....... G01N 21/95692 |
| JP | 2013-024560 | A | 2/2013 | |
| WO | WO-2011060012 | A1 * | 5/2011 | ....... G01N 21/95692 |
| WO | WO-2017109635 | A1 * | 6/2017 | ....... G01N 21/8806 |

* cited by examiner

SYSTEMS AND METHODS FOR HONEYCOMB BODY INSPECTION

CROSS REFERENCE TO RELATED APPLICATION

This is a national stage application under 35 U.S.C. § 371 of International Application No. PCT/US2020/045112, filed on Aug. 6, 2020, which claims the benefit of priority under 35 U.S.C § 120 of U.S. Provisional Application Ser. No. 62/893,906 filed on Aug. 30, 2019, the content of which is relied upon and incorporated herein by reference in its entirety their entireties.

BACKGROUND

Honeycomb bodies are used in a variety of applications, such as the construction of particulate filters and catalytic converters that treat unwanted components in a working fluid, such as pollutants in a combustion exhaust. The manufacture of honeycomb bodies may include inspection for the presence of surface defects that might be present and that could adversely impact performance of the honeycomb body.

SUMMARY

Various approaches are described herein for, among other things, providing improved imaging and inspection of a honeycomb body. For instance, an apparatus for inspecting a honeycomb body can be configured to provide precise imaging of the entire outer surface of a honeycomb body. The inspection apparatus can be configured to form a composite image based on multiple collected images. The instruction to take each image can be triggered by circumferential travel of a honeycomb body.

In one aspect, an apparatus to inspect a honeycomb body is provided. The apparatus comprises an actuator supporting the honeycomb body, the actuator configured to rotate the honeycomb body continuously over at least a portion of a full rotation of the honeycomb body about an axis of rotation; a camera having a field of view encompassing an inspection region of an outer circumferential surface of the honeycomb body; a sensor that measures circumferential travel along a circumference of the honeycomb body when the honeycomb body is rotated by the actuator, the sensor configured to trigger the camera to collect an image of the inspection region of the honeycomb body at a predetermined increment of circumferential travel; and a light source having an illumination area that encompasses the inspection region of the outer circumferential surface of the honeycomb body.

In some embodiments, an angle between an illumination axis of the light source and an optical axis of the camera is less than or equal to 15°. In some embodiments, the light source comprises a plurality of light sources and the angle between the illumination axis of each of the plurality of light sources and the optical axis of the camera is less than or equal to 15°. In some embodiments, the plurality of light sources has a combined intensity of at least two million lux.

In some embodiments, the camera has a depth of field that is centered on the outer circumferential surface of the honeycomb body so that the depth of field extends approximately 5 mm outward and 5 mm inward from the outer circumferential surface of the honeycomb body at a center of the inspection region.

In some embodiments, the light source has an intensity of at least one million lux. In some embodiments, the sensor is an encoder having a measurement resolution of less than or equal to 0.2 μm.

In some embodiments, the camera comprises a plurality of cameras. In some embodiments, the plurality of cameras is distributed around the circumference of the honeycomb body, the field of view of each of the cameras comprises a length measured parallel to the axis of rotation that is greater than or equal to a full length of the honeycomb body. In some embodiments, the plurality of cameras is distributed parallel to the axis of rotation, the plurality of cameras having a combined field of view having a combined length measured parallel to the axis of rotation that is greater than or equal to a full length of the honeycomb body.

In some embodiments, the field of view comprises a length measured parallel to the axis of rotation that is greater than or equal to a full length of the honeycomb body measured parallel to the axis of rotation. In some embodiments, the apparatus further comprises a distance sensor configured to determine a distance between the camera and the honeycomb body in a direction parallel to an optical axis of the camera.

In some embodiments, the apparatus further comprises a loading mechanism configured to place the honeycomb body on the actuator.

In some embodiments, the apparatus further comprises a control unit configured to analyze the image to identify one or more surface defects.

In some embodiments, the apparatus further comprises a rejection actuator configured to move the honeycomb body to a rejection receptacle based at least in part on a number of identified surface defects being greater than or equal to a predefined threshold.

In some embodiments, the apparatus further comprises a marking device configured to apply an indicium to a surface of the honeycomb body based at least in part on a number of identified surface defects being less than a predefined threshold. In some embodiments, wherein the indicium indicates that the honeycomb body has passed inspection.

In some embodiments, the actuator is spaced from a portion of an intersection between an end face of the honeycomb body and the outer circumferential surface of the honeycomb body in the inspection region.

In another aspect, an apparatus to inspect a honeycomb body is provided. The apparatus comprises an actuator configured to engage and support an outer circumferential surface of the honeycomb body, the actuator configured to rotate the honeycomb body continuously over at least a portion of a full rotation of the honeycomb body about an axis of rotation; a camera having a field of view encompassing an inspection region of the outer circumferential surface of the honeycomb body; a sensor configured to trigger the camera to collect an image of the inspection region of the outer circumferential surface of the honeycomb body at a predetermined interval; a light source having an illumination area that encompasses the inspection region of the outer circumferential surface of the honeycomb body.

In some embodiments, the actuator comprises a pair of rollers configured to receive the honeycomb body, wherein rotation of at least one of the rollers causes rotation of the honeycomb body due to frictional engagement between the outer circumferential surface of the honeycomb body and the at least one roller.

In some embodiments, the sensor measures circumferential travel along a circumference of the honeycomb body when the honeycomb body is rotated by the actuator, and the predetermined interval comprises an increment of circumferential travel.

In some embodiments, an angle between an illumination axis of the first light source and an optical axis of the camera is less than or equal to 15°, and an angle between an illumination axis of the second light source and the optical axis of the camera is less than or equal to 15°.

In some embodiments, the first light source has an intensity of at least one million lux, and the second light source has an intensity of at least one million lux. In some embodiments, the sensor is an encoder. In some embodiments, the sensor has a measurement resolution of less than or equal to 0.2 µm.

In another aspect, a method of inspecting an outer circumferential surface of a honeycomb body is provided. The method comprises continuously rotating the honeycomb body via an actuator engaged with an outer circumferential surface of the honeycomb body; measuring circumferential travel along a circumference of the outer circumferential surface of the honeycomb body; triggering a camera to collect a plurality of images of the outer circumferential surface of the honeycomb body, the plurality of images collected at predetermined increments of circumferential travel of the outer circumferential surface over a single rotation of the honeycomb body; combining the plurality of images into a composite image; and analyzing the composite image to identify one or more surface defects on the outer circumferential surface of the honeycomb body.

In some embodiments, the method further comprises rejecting the honeycomb body based at least in part on a number of identified surface defects being greater than or equal to a predefined threshold.

In some embodiments, the method further comprises applying an indicium to a surface of the honeycomb body based at least in part on a number of identified surface defects being less than a predefined threshold.

In some embodiments, a sensor measures the circumferential travel with a resolution of less than or equal to 0.2 µm.

In some embodiments, the actuator comprises a pair of rollers configured to receive the honeycomb body, wherein continuously rotating honeycomb body comprises rotating at least one of the rollers to rotate the honeycomb body about a longitudinal axis of the honeycomb body due to frictional engagement between the outer circumferential surface of the honeycomb body and the at least one roller.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
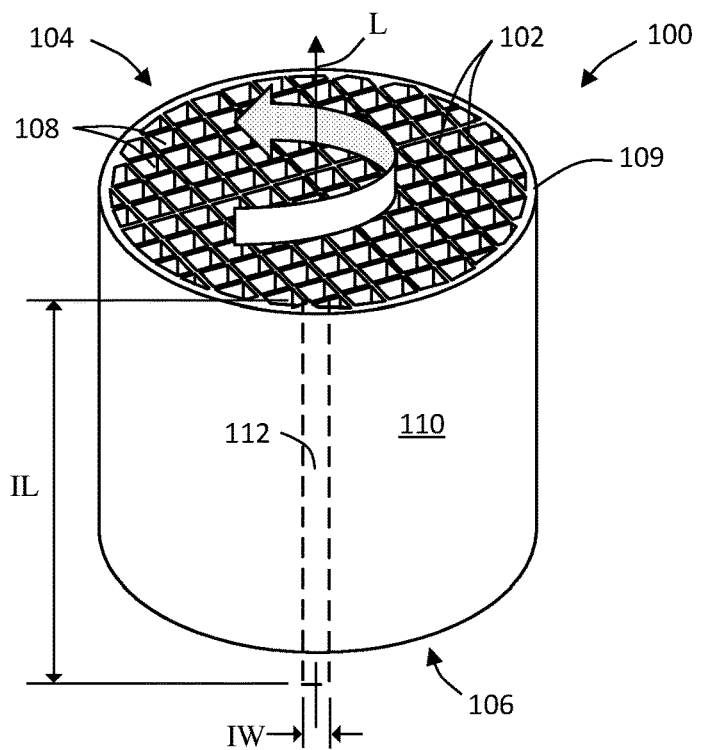
FIG. 1 is a perspective view of an exemplary honeycomb body.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The following detailed description refers to the accompanying drawings that illustrate embodiments of the present disclosure. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example," or the like, indicate that the embodiment described may include a particular feature, structure or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Embodiments described herein provide improvements over known inspection systems utilized for inspecting the outer surface of a honeycomb body. Advantages of the embodiments described herein include simplified loading that does not require the parts to be precisely located on an actuator, resulting in reduced labor costs. The disclosed embodiments avoid distorted or incomplete images based on variations in rotational speed. The embodiments provide high precision imaging based on direct measurement of circumferential travel of a honeycomb body. A further advantage is that the embodiments described herein allow surface anomalies on a honeycomb body to be characterized and sized to enable a determination of whether any anomalies are present, and if so, whether any such anomaly is a defect that requires repair or rejection of the honeycomb body. The embodiments also enable magnified images to be collected for quality control and process monitoring.

Figure 2:
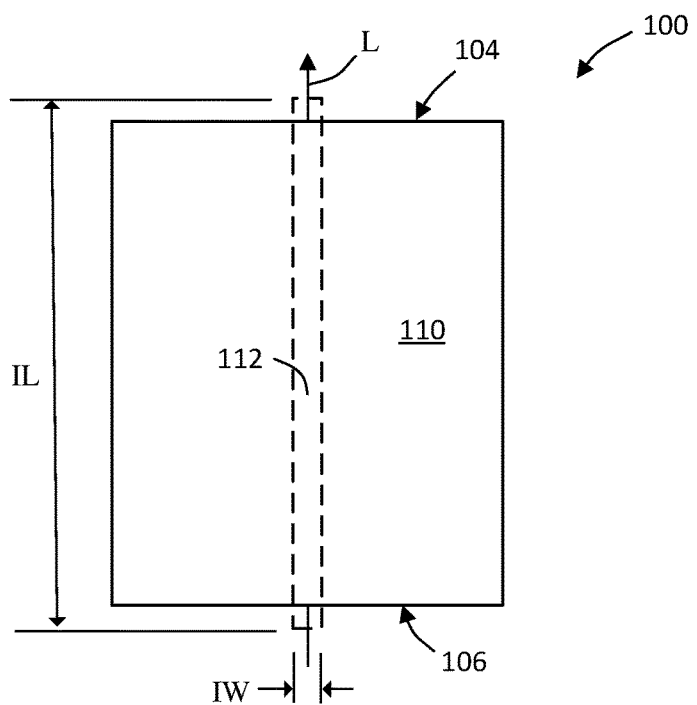
FIG. 2 is a side view of the honeycomb body of FIG. 1.

FIGS. 1 and 2 illustrate an exemplary honeycomb body 100. The honeycomb body 100 is generally formed from an extruded ceramic material. The honeycomb body 100 comprises a plurality of intersecting inner walls 102 extending longitudinally through the honeycomb body 100, substantially parallel to a longitudinal axis L, from a first end 104 to a second end 106. The inner walls 102 combine to define a plurality of channels, or cells 108, that form bores, or lumens, extending through the honeycomb body 100 from the first end 104 to the second end 106 and form the cellular honeycomb construction of the honeycomb body 100. The honeycomb body 100 can be constructed from porous ceramic materials.

An outer skin 109 surrounds the inner walls 102 and defines an outer eral surface 110 of the honeycomb body 100. The outer surface 110 refers to the circumferential surface extends longitudinally between opposite ends 104, 106 of the honeycomb body 100. For ease of discussion herein, the term circumferential (and/or circumference) is used, however, the honeycomb body 100 can take shapes other than cylindrical and the circumferential surface is intended to refer to the outer peripheral surface of any such shape. The outer skin 109 forms and defines the outer shape of the honeycomb body 100. The systems and methods disclosed herein are arranged to detect whether any anomalies are present in and/or on the outer skin 109. If an anomaly is detected, some of these anomalies may be merely aesthetic while others may be defects that cause the honeycomb body to fail inspection, e.g., necessitate the repair or rejection of the honeycomb body 100. The embodiments described herein are capable of determining when an anomaly constitutes such a defect. Examples of aesthetic anomalies include but are not limited to side stick, loose fibers, tube gauge marks, and corrugation. Examples of defects (which may require repair or rejection) include but are not limited to macro/micro full fissures, macro/micro partial fissures, oil fissures, raised fissures, air checks, and edge chips.

Methods and apparatuses for inspecting a honeycomb body are described herein. Such an inspection apparatus can be configured to provide a composite image of the entire outer surface 110 to provide repeatable full inspection coverage of the outer surface 110. For example, the inspection apparatus can be configured to capture a series of images corresponding to an inspection region 112 that extends over the entire length of the honeycomb body 100 and a predefined portion of the circumference of the honeycomb body 100. The images of the inspection region are combined to form a composite image showing the entire outer surface 110.

Figure 3:
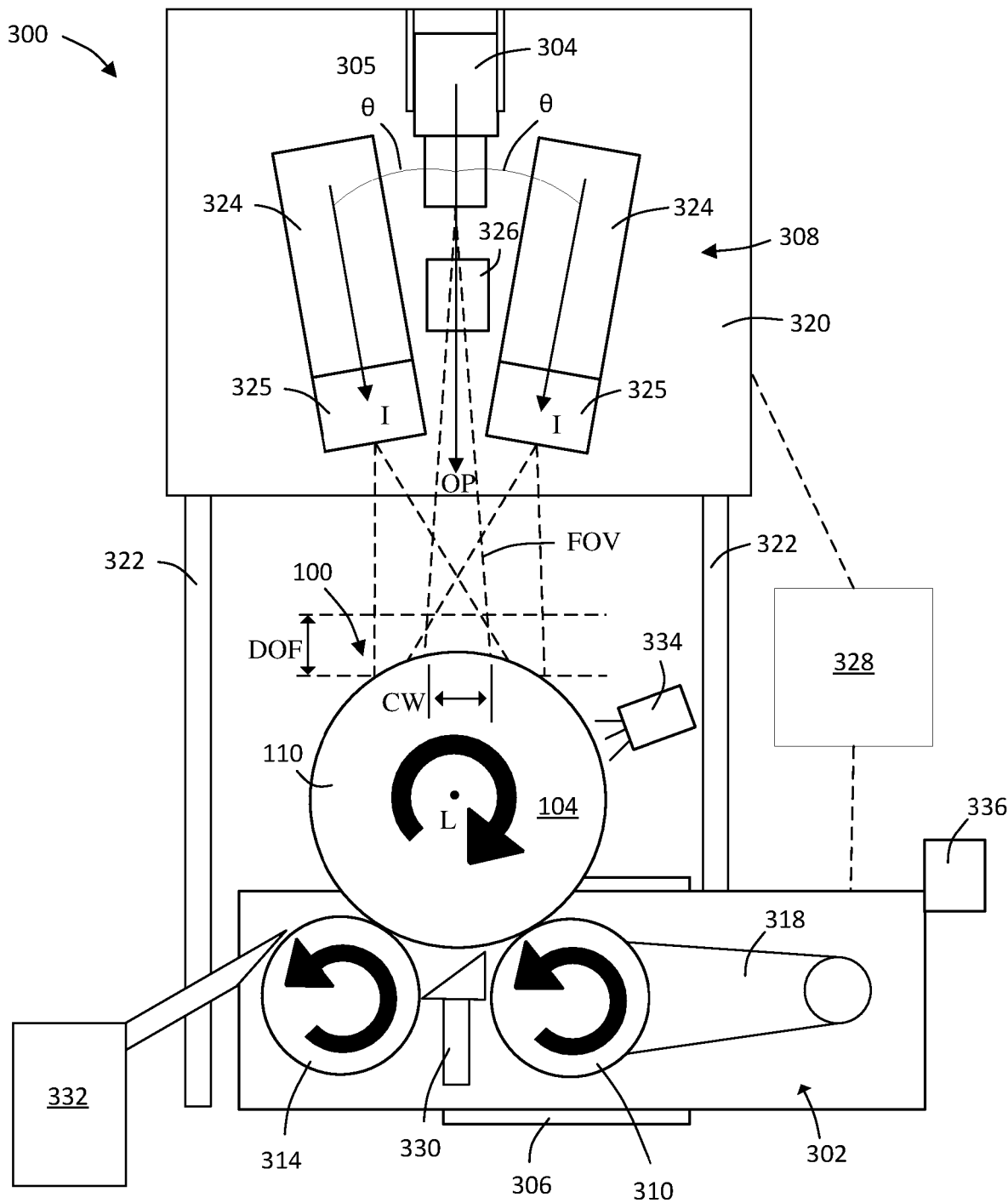
FIG. 3 is a front view of an example apparatus to inspect a honeycomb body in accordance with an embodiment.
Figure 4:
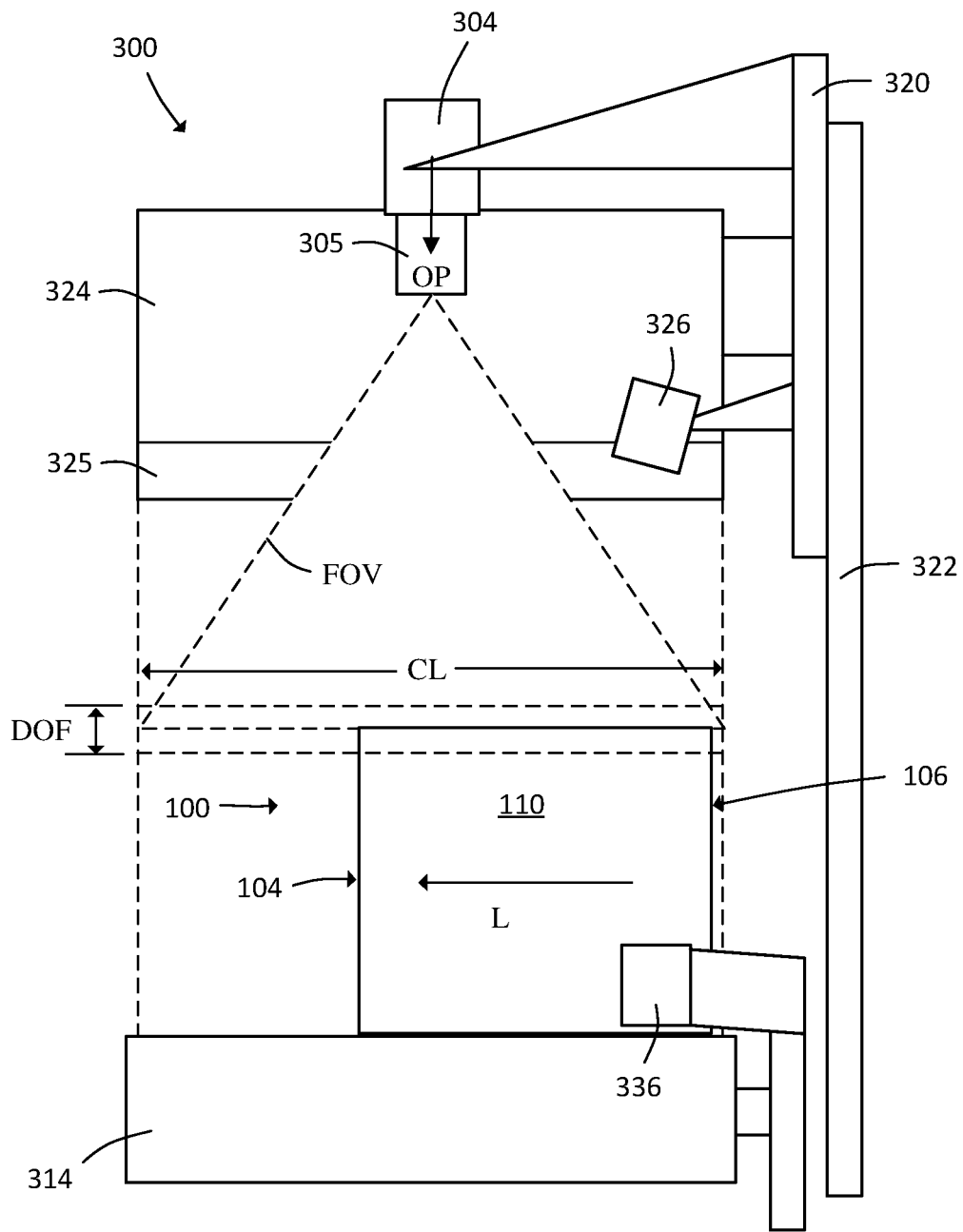
FIG. 4 is a side view of a portion of the example apparatus of FIG. 3.
Figure 5:
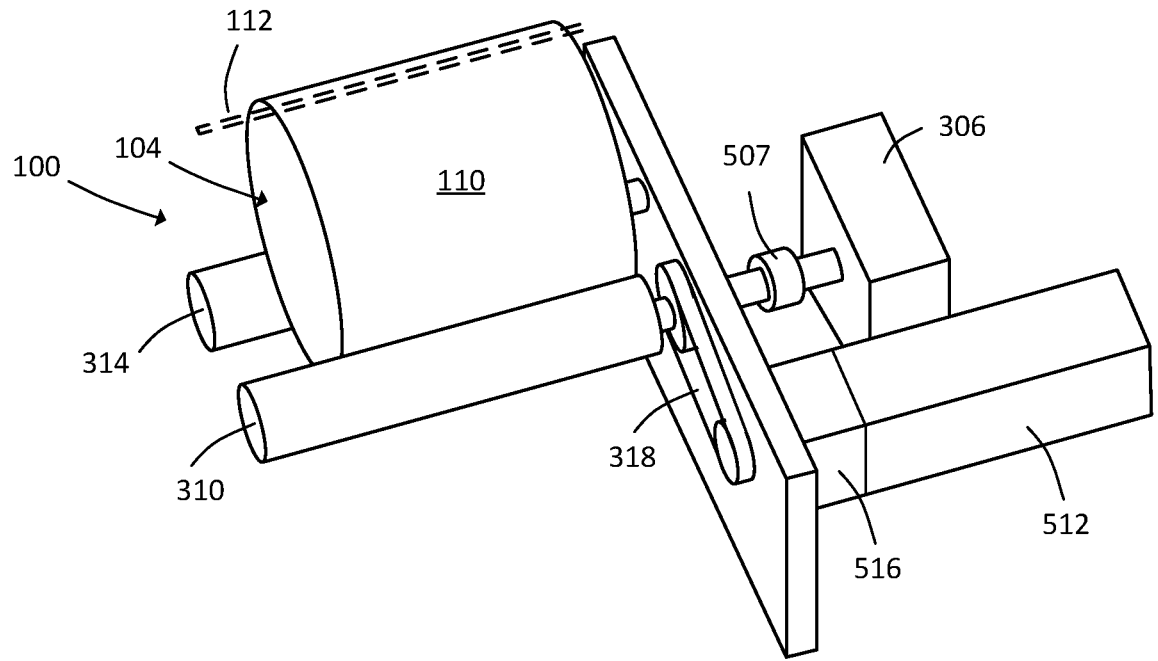
FIG. 5 is a perspective view of a portion of the example apparatus of FIG. 3.

Referring to FIGS. 3-5, an example apparatus 300 to inspect a honeycomb body 100 will be described. Apparatus 300 comprises an actuator 302, a camera 304, a sensor 306, and a light source assembly 308. The actuator 302 supports the honeycomb body 100 during inspection and is configured to rotate the honeycomb body 100. In an embodiment, the actuator 302 is configured to rotate the honeycomb body 100 continuously over at least a full rotation of the honeycomb body 100 about a longitudinal axis L. In an embodiment, actuator 302 comprises at least one drive roller 310 that is driven by a motor 512, and that forces the honeycomb body 100 to rotate. The drive roller 310 contacts the outer surface 110 of honeycomb body 100 and can be at least partially constructed of a material that creates friction between the drive roller 310 and the outer surface 110. In this way, rotation of the drive roller 310 results in rotation of the honeycomb body 100 when the surface 110 of the honeycomb body 100 is engaged against the drive roller 310. The drive roller 310 can comprise a relatively soft material to cushion the honeycomb body 100. For instance, the material can be polyurethane.

In an embodiment, the actuator 302 also comprises a second roller 314, e.g., that is freely rotatable. The second roller 314 combines with the drive roller 310 to form a support for the honeycomb body 100. For instance, the second roller 314 and the drive roller 310 can support the honeycomb body 100 when the honeycomb body 100 is received in a gap 315 formed between the drive roller 310 and the second roller 31. The honeycomb body 100 can be supported in a horizontal orientation, though the honeycomb body 100 can be supported in any suitable orientation. The second roller 314 is configured to rotate with the rotation of the honeycomb body 100, which is forced to rotate by drive roller 310. In an embodiment, drive roller 310 and second roller 314 are disposed on a side of the honeycomb body 100 that is opposite the inspection region 112 so that the rollers 310 and 314 are spaced from a perimeter of the inspection region 112. That spacing ensures that the rollers 310 and 314 do not interfere with a field of view of the camera 304 or the illumination provided by the light source assembly 308, such as by creating reflections off of the actuator 302. An advantage provided by the roller system of actuator 302 is that precise alignment between the longitudinal axis L of the honeycomb body 100 and the rotational axis of the actuator is not required. Instead, the honeycomb body 100 will rotate about the longitudinal axis L (e.g., the central axis of the honeycomb body 100 when the honeycomb body is cylindrical) when engaged with the rollers 310, 314. Additionally, since the outer surface 110 engages with the rollers 310, 314, the honeycomb body 100 can advantageously be loaded onto the rollers 310, 314 without the need to contact or engage the ends 104, 106, which are generally more susceptible to damage than the outer skin 109.

The honeycomb body 100 can be loaded onto the actuator 302 manually or automatically. For example, an operator can manually load the honeycomb body 100 onto the actuator 302. In another example, the apparatus comprises a loading mechanism, such as a robot, that is configured to place the honeycomb body 100 onto the actuator 302.

As shown in FIG. 5, a motor 512 is coupled to the drive roller 310 to enable rotation of the drive roller 310 via the motor 512. In an embodiment, motor 512 is coupled to the driver roller 310 via a gearbox 516. The gear box 516 can be coupled to a drive mechanism 318, such as a belt or chain drive. As alternatives, motor 512 or gearbox 516 can be directly coupled to drive roller 310. Motor 512 can be a servo motor, but other motors can be used, such as an electric motor or a pneumatic motor. In an embodiment, the rotational speed of the motor 512 is set so that the outer surface 110 of the honeycomb body 100 travels at a speed of at least 125 mm/s, in an embodiment at least 150 mm/s, and in an embodiment at least 250 mm/s.

The camera 304 is arranged relative to the honeycomb body 100 so that the camera 304 defines a field of view FOV and depth of field DOF that encompass the desired inspection region 112 of the outer surface 110 of the honeycomb body 100. For example, the field of view FOV can be sized to have a length dimension CL that is greater than or equal to a length dimension IL of the inspection region 112 in a direction parallel to the axis of rotation (e.g., longitudinal axis L), of the honeycomb body 100 so that the camera 304 is configured to image the entire length of the honeycomb body 100. In an embodiment, the field of view FOV length dimension CL is at least about 3%, about 5%, or even about 10% longer than the length dimension IL of inspection region 112 and/or of the full length of the honeycomb body between the ends 104, 106. Additionally, the field of view FOV is sized to have a width dimension CW that encompasses a width dimension IW that is an arc length of the inspection region 112, so that the camera 304 is configured to image a predefined length of the circumference of the honeycomb body 100. In an embodiment the width dimension IW of the inspection region 112 is in a range of 2-20 μm, in a further embodiment in a range of 5-15 μm, and in a further embodiment about 10 μm.

Figure 6:
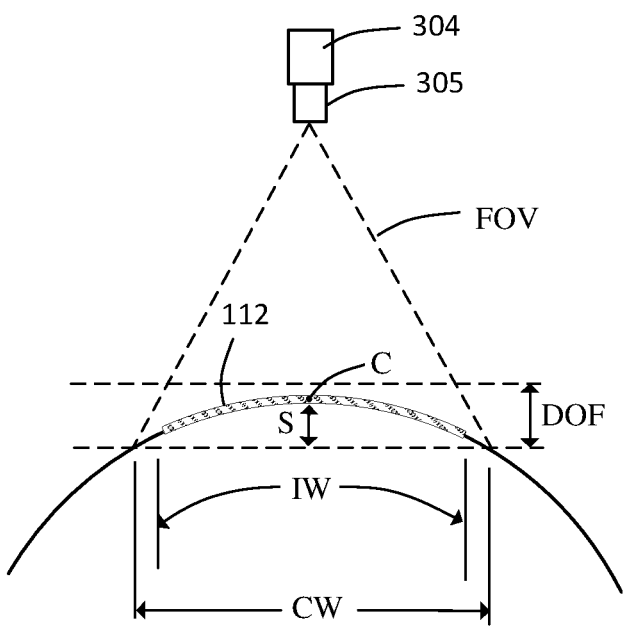
FIG. 6 is a side schematic view of an outer surface of honeycomb body including an inspection region.

Additionally, the camera 304 is selected so that the depth of field DOF allows the entire portion of the outer surface 110 encompassed by the inspection region 112 to be in focus. For example, the outer surface 110 is curved generally about the longitudinal axis L of the honeycomb body 100. As a result, portions of the outer surface 110 within the inspection region 112 are at different distances from the camera 304, when measured parallel to optical axis OP of the camera 304. The difference between the minimum distance to the camera and the maximum distance to the camera of the outer surface 110 in the inspection region 112 defines a segment depth S, shown in FIG. 6, and the depth of field DOF of the camera is greater than or equal to the segment depth S. In an embodiment, an inspection apparatus can be configured to inspect a honeycomb body 100 having a diameter of about 6.0" by providing a camera configured to image an inspection region 112 having a length dimension IL of about 6.2", and a width dimension IW of about 10 μm, within a depth of field of 10 mm (i.e., +/−5 mm from the outer surface 110).

The camera 304 can be coupled to a lens 305 to provide magnification and/or to alter the field of view FOV of the camera 304. In an embodiment, the lens is a telecentric lens. In an embodiment, the lens is a macro lens. In an embodiment, the lens provides magnification in a range of ×0.05-×2.0. In an embodiment, the lens provides ×0.35 magnification.

Still further, the camera 304 is selected to provide a data transfer rate that supports an inspection cycle time that is significantly less than 60 seconds. In an embodiment, the data transfer rate is fast enough to capture images of the entire outer surface 110 of the honeycomb body 100 and transfer the captured images to storage in less than 20 seconds. In an embodiment, the cycle time is less than about 5 seconds, less than about 2 seconds, or more preferably less than about 1.5 seconds. In an embodiment, the camera 304 is a line scan camera. In one embodiment, the camera 304 is constructed from a linear array of 10k-20k pixels having 0.5 μm-7.5 μm resolution, and in an embodiment a linear array of 16k pixels having 3.5 μm pixel resolution.

The inspection apparatus 300 can also comprise a movable fixture that is configured to provide relative movement between the camera 304 and the honeycomb body 100 in the direction parallel to the optical axis OP of the camera. For example, the movable fixture can be a translation slide mechanism that comprises a camera mount 320 and at least one slide rail 322. The camera mount 320 is movably coupled to the slide rail 322 so that the camera mount 320 can be translated. The slide rail 322 can be fixed relative to the honeycomb body 100. The camera 304 can be fixedly coupled to the camera mount 320 in an orientation that allows the camera 304 to be translated relative to the slide rail 322 and the honeycomb body 100 in a direction parallel to the optical axis OP of the camera 304. In an embodiment, the slide rail 322 is oriented vertically so that the camera 304 is translatable in a vertical axis toward and away from the honeycomb body 100. In an embodiment, the camera 304 is positioned so that a center of the depth of field DOF is located approximately on a nominal diameter of the honeycomb body 100 being inspected, for example so that the depth of field defines a focused region that extends 5 mm outward and 5 mm inward from the nominal outer diameter of the honeycomb body 100 at the center C of the width dimension IW of the inspection region 112 (i.e., +/−5 mm).

Sensor 306 is comprised by inspection apparatus 300 and is configured to measure circumferential travel of the honeycomb body 100 as it is rotated by the drive roller 310 of the actuator 302. The sensor 306 is employed to trigger the camera 304 to collect images of the inspection region 112 of the honeycomb body 100 as it is rotated, i.e., to send a signal instructing or otherwise activating the camera 304. Because circumferential travel is used to trigger the camera 304 to collect images, variations of rotational speed of the honeycomb body 100 advantageously do not affect the composite image, and no portions of the outer surface 110 are inadvertently missed during imaging. For example, the sensor 306 is configured to trigger the camera 304 to collect an image of the inspection region 112 at a predetermined increment of circumferential travel of outer surface 110 of honeycomb body 100. In an embodiment, sensor 306 is coupled to drive roller 310. The drive roller 310 directly contacts the outer surface 110 of the honeycomb body 100, so the circumferential travel of drive roller 310 is the same as the circumferential travel of the outer surface 110 during rotation. In an embodiment, the sensor 306 is an encoder that is coupled to drive roller 310, but the sensor 306 is not limited to an encoder and can include contact or non-contact travel measuring devices. The sensor 306 can be coupled to the drive roller 310 using a flexible rotating coupling 507 so that the roller 310 and/or sensor 306 do not bind or damage each other during rotation. In an embodiment, the sensor 306 is an encoder having a measurement resolution of less than 0.5 μm, in an embodiment less than 0.2 μm, and in an embodiment less than 0.1 μm. In an embodiment, the sensor 306 triggers the camera 304 to collect an image at each increment of 10 μm of circumferential travel of the outer surface 110 as the honeycomb body 100 rotates continuously.

Light source assembly 308 is configured to emit light and to direct the light onto the outer surface 110 of the honeycomb body 100. The emitted light forms an illumination area on the outer surface 110 that encompasses the inspection region 112 so that the inspection region 112 is illuminated during image capture by camera 304. Light source assembly 308 comprises at least one light source 324 that defines an illumination axis I, and can comprise a plurality of light sources 324. The light sources 324 can be high intensity monochromatic LED light sources, such as a light source 324 constructed from an array of LED light sources. The light emitted by the light source 324 is defined by at least one wavelength, and the wavelength can be selected to match the material of the honeycomb body 100 to provide desired image quality. In an embodiment, the light source assembly 308 is configured to emit white light, and in another embodiment the light source assembly 308 is configured to emit red light. Each light source 324 can also comprise a lens 325 that can provide a very highly focused and narrow illumination area, such as line-illumination of a portion of the honeycomb body 100. In an embodiment, the light source is configured to provide an illumination area having a length of at least 200 mm.

In the illustrated embodiment, light source assembly 308 comprises a pair of light sources 324, each defining an illumination axis I. In embodiments that include a plurality of light sources 324, each of the light sources 324 can be a focused high intensity light source configured to form an illumination area on the outer surface 110 that encompasses the inspection region, so that the illumination areas of the plurality of light sources 324 overlap. In an embodiment, the light source 324 is oriented to define an illumination angle θ between the illumination axis I and the optical axis OP of the camera. In an embodiment, the illumination angle θ is as close as possible to 0° so the visibility of some surface anomalies, such as corrugation, is reduced. In an embodiment, the illumination angle θ is less than or equal to 15°, less than or equal to 12°, or even less than or equal to 10°. In an embodiment, a pair of light sources is included, and the light sources are disposed on opposite sides of the optical axis OP of the camera 304 and provide illumination angles of +θ and −θ. The light source assembly 308 can be configured to emit high intensity light, such as having a total intensity of at least one million lux, and in an embodiment at least two million lux. For example, a plurality of light sources can be included having a combined intensity of two million lux.

The inspection apparatus 300 can also comprise a distance sensor 326 that provides information related to the distance between the camera 304 and the honeycomb body 100. Distance sensor 326 is configured to determine a distance between the camera 304 and the honeycomb body 100 in a direction parallel to the optical axis OP of the camera 304. In an embodiment, distance sensor 326 is coupled to the camera mount 320 so that the distance sensor 326 is movable with the camera 304. The measurement information provided by the distance sensor 326 can be used after the honeycomb body 100 is loaded on the actuator 302 to position the camera 304 relative to the honeycomb body 100, so that the depth of field DOF provided by the camera 304 encompasses the inspection region 112 on the honeycomb body 100. The distance sensor can be a laser-based system, such as a laser proximity sensor, that directs a laser toward the outer surface 110 of the honeycomb body 100, senses a reflection of the laser, and converts that information into distance data.

In some embodiments, the inspection apparatus 300 comprises a control unit 328. The control unit 328 can be configured to analyze images of the outer surface 110 of honeycomb body 100, to identify one or more surface defects by determining if an anomaly should be classified as a defect, and to output results of the analysis. For example, the control unit 328 can sequentially stitch together the images of the inspection region taken by the camera 304 as the honeycomb body 100 rotates to form a composite image. The composite image shows the entire outer surface 110 including surface anomalies that may be defects. The control unit 328 analyzes the anomalies, such as by collecting measurement information and/or by classifying the anomaly into types by shape or another characteristic, to determine whether the anomalies are defects. The control unit 328 can also be configured to count the defects and to determine whether the number of defects exceeds a predefined threshold of number of defects. In an embodiment, the threshold number of defects is 10. In another embodiment, the threshold number of defects is 5, or 3, or even 1. As an example, the determination from the control unit 328 can be used to sort or mark a honeycomb body 100.

In an embodiment, the apparatus 300 comprises a rejection actuator 330 used to sort the inspected honeycomb bodies. In an embodiment, the rejection actuator 330 is arranged as a movable wedge that selectively extends and contacts a portion of the honeycomb body 100. In one example, the rejection actuator 330 is disposed between drive roller 310 and second roller 314 below the honeycomb body 100. In another example, the rejection actuator 330 is disposed on a side of the honeycomb body 100. Movement of the rejection actuator 330 can be based at least in part on the number of identified defects determined by the control unit 328. For example, the honeycomb body 100 can be rejected if the honeycomb body 100 comprises a number of surface defects that is greater than or equal to a threshold, such as ten, five, or even one surface defects. If a honeycomb body 100 is determined to include enough defects to be rejected, the rejection actuator 330 is translated toward the honeycomb body 100 and the actuator 330 (e.g., the wedge shaped body) causes the honeycomb body 100 to be ejected from actuator 302 and into a rejection receptacle 332 that is disposed adjacent the actuator 302.

In an embodiment, the apparatus 300 comprises a marking device 334. The marking device 334 is configured to apply at least one indicium to a surface of the honeycomb body 100, such as by spraying ink onto the outer surface 110 of the honeycomb body 100. The marking device 334 can be operated to indicate passing and/or failing inspection by the honeycomb body 100, such as by writing "pass," "good," "fail", or "reject" and/or by marking a symbol (e.g., check mark, X, circle, or other shape, icon, letter, color, symbol, or combinations thereof) on a surface of the honeycomb body 100. Operation of the marking device 334 can be based at least in part on the number of identified defects determined by the control unit 328. For example, the honeycomb body 100 can be passed or rejected based on a threshold as described above, and the honeycomb body 100 can be marked accordingly. In an example, the honeycomb body 100 is marked as passing inspection (e.g., by applying "pass" or "good" on the outer surface 110) using the marking device 334 if a number of identified surface defects is less than the threshold.

A part presence sensor 336 can be comprised by apparatus 300 to identify when a honeycomb body 100 is disposed on actuator 302 and can be used to initiate inspection of the honeycomb body 100. The part presence sensor 336 can be fixed on a portion of actuator 302 and can be directed to a location adjacent driver roller 310 that is occupied by a loaded honeycomb body 100. The part presence sensor 336 can be a laser presence sensor. In an embodiment, the presence of the honeycomb body 100 can be determined by distance sensor 326 instead of the part presence sensor 336.

Figure 7:
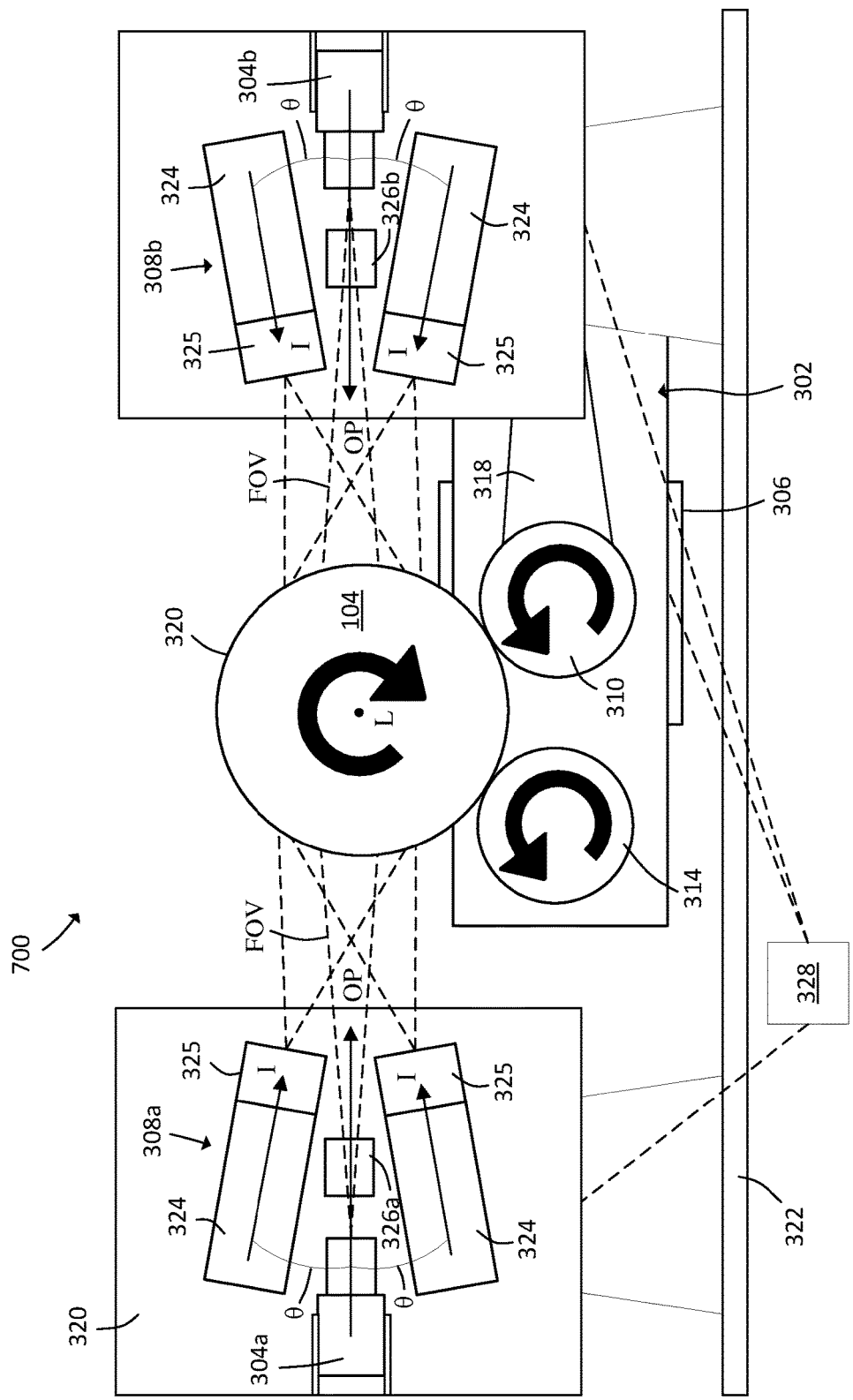
FIG. 7 is a front view of an example apparatus to inspect a honeycomb body in accordance with an embodiment.

Referring now to FIG. 7, another example apparatus 700 to inspect a honeycomb body 100 will be described. Apparatus 700 provides a configuration that can reduce the amount of time to perform an inspection of the entire outer surface 110 of the honeycomb body 100 by a plurality of cameras distributed around the circumference of the honeycomb body 100. Apparatus 700 comprises actuator 302, a first camera 304a, a second camera 304b, sensor 306, a first light source assembly 308a, and a second light source assembly 308b. Apparatus 100 can also comprise control unit 328, a first distance sensor 326a, and a second distance sensor 326b. For ease of discussion herein, any component having a base reference numeral appended by an alphabetic suffix (e.g., 'a', 'b', etc.) generally shares the description of that component identified with the base numeral without suffix. For example, the structure and operation of the distance sensors 326a and 326b is understood from the description of distance sensor 326. In this way, the actuator 302, sensor 306, light source assemblies 308a, 308b, control unit 328, and distance sensors 326a, 326b were incorporated in the previously described embodiments and will not be described in further detail.

Apparatus 700 comprises first camera 304a and second camera 304b that are distributed around the circumference of the honeycomb body 100, and both cameras 304a, 304b are triggered based on measurement of travel by sensor 306. Otherwise, cameras 304a, 304b are constructed as previously described. In an embodiment, each camera captures images of the outer surface 110 at diametrically opposed locations on the honeycomb body 100. Each of first camera 304a and second camera 304b is configured to have a field of view having a length measured parallel to the axis of rotation of honeycomb body 100, such as the longitudinal axis L, that is greater than or equal to the length of the honeycomb body 100. As a result, the images can be combined by control unit 328 to create a composite image of the entire outer surface 110 after the honeycomb body 100 has made half of a full rotation about its longitudinal axis L. Similar to previous embodiments, the apparatus is configured so that the cameras and the honeycomb body 100 are able to move relative to each other in a direction substantially parallel to the optical axes OP of the cameras.

Figure 8:
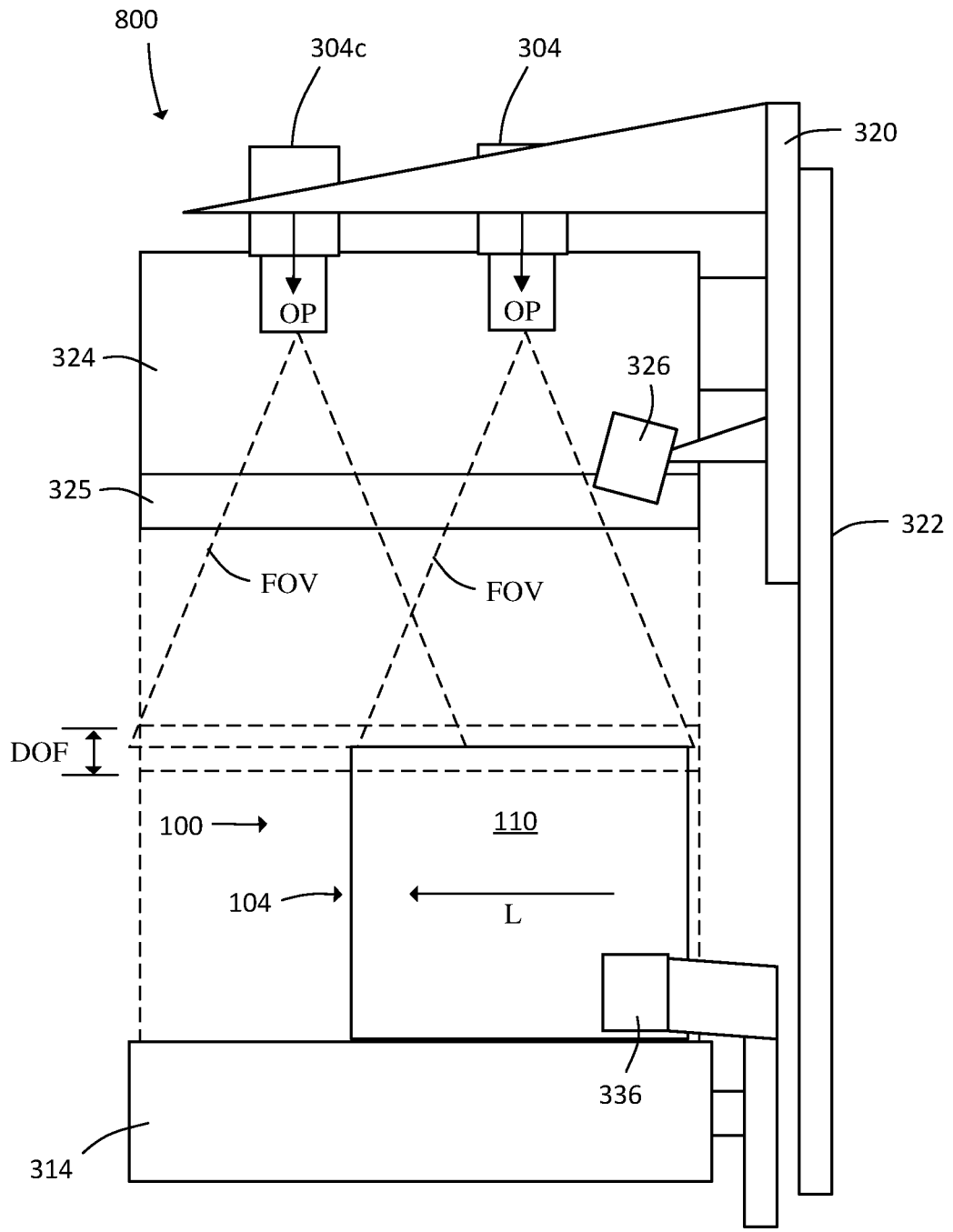
FIG. 8 is a side view of a portion of an example apparatus to inspect a honeycomb body in accordance with an embodiment.

Referring now to FIG. 8, an apparatus 800 to inspect a honeycomb body 100 will be described. Apparatus 800 provides another configuration that can utilize a plurality of cameras to capture images of an outer surface 110 of a honeycomb body 100. An advantage of the configuration is that additional cameras can be incorporated to increase the length dimension IL of the inspection region 112 that can be imaged to accommodate honeycomb bodies having greater length. Apparatus 800 comprises actuator 302, first camera 304a, second camera 304b, sensor 306, and light source assembly 308. Apparatus 100 can also comprise distance sensor 326, and part presence sensor 336. The actuator 302, sensor 306, light source assembly 308, distance sensor 326, and part presence sensor 336 were incorporated in the previously describe embodiments and will not be described in further detail.

Apparatus 800 comprises first camera 304c and second camera 304d that are distributed parallel to the axis of rotation, and longitudinal axis L, of the honeycomb body 100, and both cameras 304c, 304d are triggered based on measurement of travel by sensor 306. Otherwise, cameras 304c, 304d are constructed as previously described. The first camera 304c and second camera 304d are configured to have a combined field of view having a length measured parallel to the axis of rotation that is greater than or equal to the length of the honeycomb body 100. As a result, the images can be combined by a control unit (e.g., control unit 328) to create a composite image of the entire outer surface 110 after the honeycomb body 100 has made a full rotation about its longitudinal axis L. Similar to previous embodiments, the apparatus is configured so that the cameras and honeycomb body 100 are able to move relative to each other in a direction substantially parallel to the optical axes OP of the cameras.

In an embodiment, such as using apparatus 300, 800, the entire outer surface 110 can be imaged by capturing images over a continuous full rotation of the honeycomb body 100. In an embodiment, such as using apparatus 700, the outer surface 110 can be imaged by capturing images over a continuous partial rotation of the honeycomb body 100. The amount of rotation can be predefined by a user, or the control unit can be configured to determine the required rotation based at least in part on dimensional attributes of the honeycomb body 100, such as outer diameter. The dimensional attributes can be entered by a user or measured using one or more of the sensors included in the apparatus. Additionally, the amount of rotation can be selected so that duplicative images are captured at the ends of the composite image to assure that the entire outer surface is imaged. In an embodiment, the apparatus is configured to base the rotation distance of a cylindrical honeycomb body 100 on the nominal diameter and adding a predefined tolerance to the distance, such as by increasing the distance by a predefined percentage. In an embodiment that predefined percentage is less than or equal to 10%, in an embodiment less than or equal to 5%, and in an embodiment less than or equal to 3%.

Figure 9:
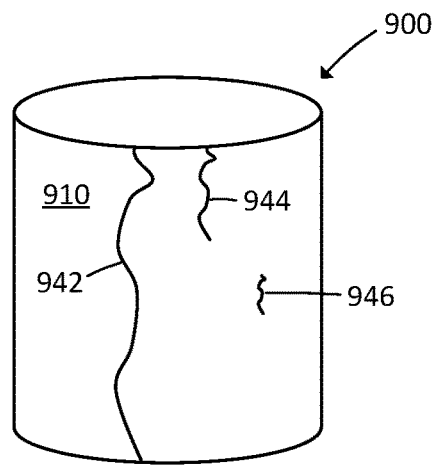
FIG. 9 is a perspective view of a honeycomb body including defects.
Figure 10:
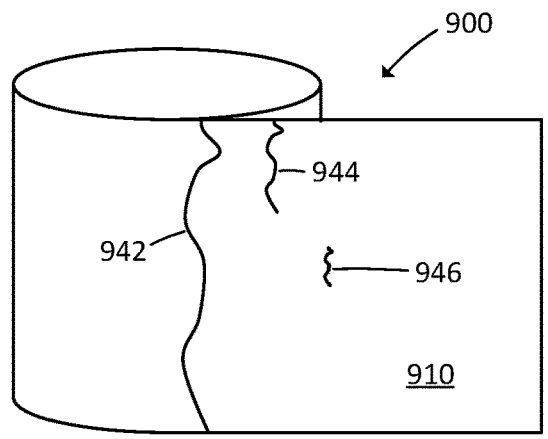
FIG. 10 is a perspective schematic view of the honeycomb body of FIG. 9.
Figure 11:
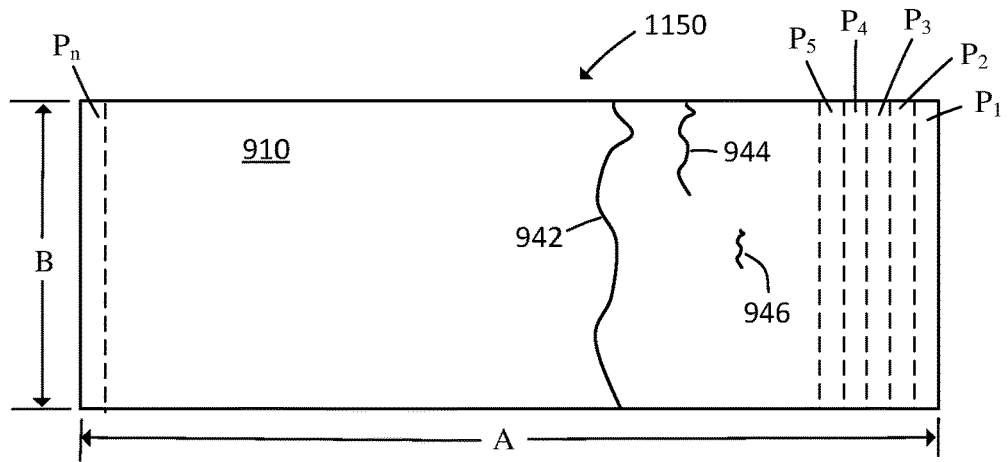
FIG. 11 is a top view of a composite image of the outer surface of the honeycomb body of FIG. 9.

Referring now to FIGS. 9-11, a honeycomb body 900 having multiple defects will be described. As described above, honeycomb bodies can have a wide variety of surface defects including full fissures, partial fissures, oil fissures, and air checks. All but full fissures extend along only a portion of the length of the honeycomb body. For example, honeycomb body 900 is illustrated having a full fissure 902, a partial fissure 904, and an oil fissure 906. The embodiments of an apparatus to inspect a honeycomb body described herein provide imaging of the entire outer surface 910 of honeycomb body 900 by imaging inspection regions of the outer surface 910. Because the imaging is triggered based on measured circumferential travel of the outer surface 910, and because the field of view of the camera is selected to capture the entire length of the honeycomb body 900, there are no portions of the outer surface 910 absent from the images. As a result, defects that do not extend across the entire length of the honeycomb body 900 do not evade inspection.

A composite image 1150 is formed from a plurality of images $P_1$-$P_n$ taken of the honeycomb body 900 as it is rotated based on an inspection region covering sequential sections around the circumference of the honeycomb body 900. If one or more extra images (e.g., image $P_{n+1}$, $P_{n+2}$, etc.) are taken duplicatively of the same area as the first images (e.g., $P_1$, $P_2$, etc.) as described above, then the duplicative images can be discarded or otherwise not used in forming the composite image 1150. Effectively, the composite image 1150 is formed as if the outer skin were peeled from the honeycomb body 900, laid flat and imaged, as shown schematically in FIG. 10, so that the length A of the composite image 1150 corresponds to the circumferential length of the honeycomb body 900 and the height B corresponds to the overall length of the honeycomb body 900. The final composite image 1150 is formed by stitching together the plurality of images P in the same sequence that they were captured, so that the final composite image 1150 accurately displays the appearance of the entire outer surface 910 including any defects on the honeycomb body 900.

Figure 12:
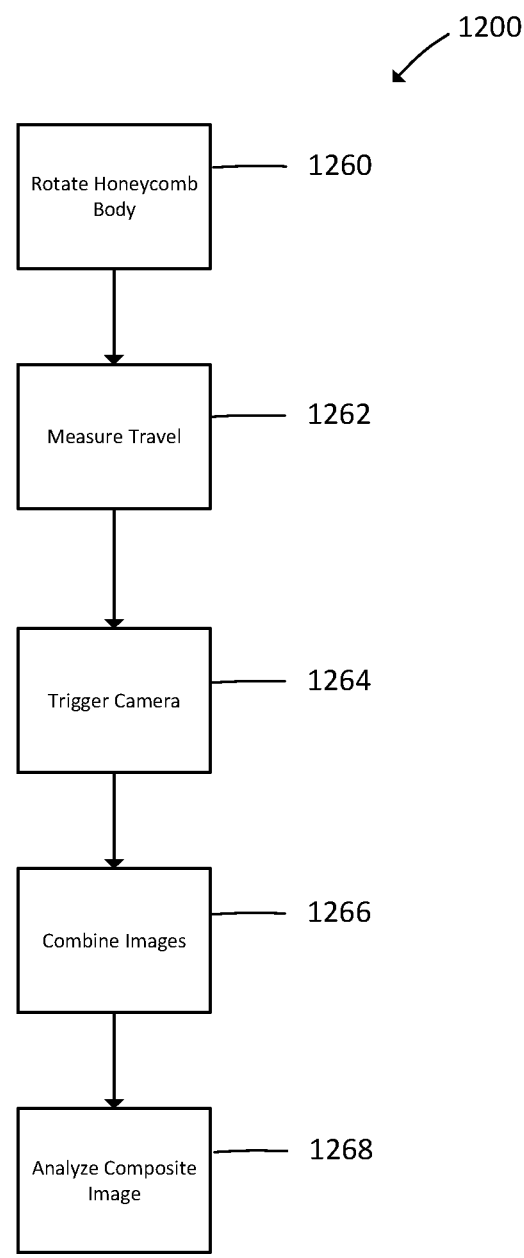
FIG. 12 depicts a flowchart of an example method of inspecting an outer surface of a honeycomb body in accordance with an embodiment.

FIG. 12 depicts a flowchart 1200 of an example method of inspecting an outer surface of a honeycomb body. Flowchart 1200 can be performed using any of the embodiments of the inspection apparatuses 300, 700, and 800 shown in respective FIGS. 3, 7, and 8, for example. Further structural and operational embodiments will be apparent to persons skilled in the relevant art(s) based on the discussion regarding the flowchart 1200.

As shown in FIG. 12, the method of flowchart 1200 begins at step 1260. In step 1260, the honeycomb body (e.g., the honeycomb body 100) is rotated. In an embodiment, rotating the honeycomb body comprises rotating the honeycomb body continuously, such as through at least one full rotation. The honeycomb body can be rotated using an actuator, such as actuator 302.

At step 1262, the circumferential travel of an outer surface of the honeycomb body is measured. In an embodiment, measuring the circumferential travel at step 1262 comprises measuring the circumferential travel along a circumference of an outer surface of the honeycomb body. In an embodiment, sensor 306 is used to measure the circumferential travel.

At step 1264, a camera is triggered to collect a plurality of images. In an embodiment, triggering the camera in step 1264 comprises triggering the camera to collect a plurality of images of the outer surface of the honeycomb body. The plurality of images are collected at predetermined increments of circumferential travel of the outer surface over a single rotation of the honeycomb body. In an embodiment, the field of view of the camera captures a portion of the circumference of the honeycomb body matched to the amount of travel used to trigger the camera. In an embodiment, the camera 304 is used to collect the plurality of images.

At step 1266, the plurality of images are combined. Combining the plurality of images in step 1266 comprises combining the plurality of images into a composite image. In an embodiment, the composite image displays the entire outer surface of the honeycomb body. In an embodiment, the plurality of images are stitched together using control unit 328.

At step 1268, the composite image is analyzed. Analyzing the composite image in step 1268 comprises analyzing the composite image to identify one or more surface defects on the outer surface of the honeycomb body. In an embodiment, the control unit 328 is used to analyze the composite image. For example, the analyzing can be conducted by one or more algorithms, such as machine learning algorithms, image processing algorithms, etc., to detect whether an anomaly is present, and/or to classify the types of anomaly. For example, image processing algorithms such as thresholding can be utilized to assist in detection of constrastingly colored anomalies (e.g., dark anomalies on a light colored outer surface 110). In one embodiment, a deep learning algorithm, e.g., a neural network configured for image classification, such as ResNet, is utilized that can be trained in a supervised manner on images of passing and failing honeycombs, such that the neural network increasingly learns to detect which anomalies are rejectable defects in comparison to anomalies that are not rejectable defects. For example, hundreds or even thousands of images showing each different type of defect or anomaly, along with anomaly-free honeycomb bodies, can be provided to the algorithm to train the algorithm to recognize each scenario and thereby classify the honeycomb accordingly. Those of skill in the art will recognize other algorithms suitable for detection and classification of the honeycomb bodies based on the collected images.

The method can also comprise rejecting the honeycomb body based at least in part on a number of identified surface defects being above a predefined threshold. In an embodiment, the honeycomb body is rejected if the number of identified surface defects is greater than or equal to 10 defects, and in another embodiment greater than or equal to 5 defects. Still further, the method can comprise applying an indicium to a surface of the honeycomb body based at least in part on a pass/fail threshold, such as a number of surface defects. In an embodiment, the honeycomb body is marked as passing inspection if the number of identified surface defects is less than 10 defects, and in another embodiment less than 5 defects.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. An apparatus to inspect a honeycomb body, comprising:
    an actuator supporting the honeycomb body, the actuator comprising a plurality of rollers including at least one roller that is driven by a motor, the plurality of rollers configured to receive and rotate the honeycomb body continuously over at least a portion of a full rotation of the honeycomb body about an axis of rotation;
    a camera having a field of view encompassing an inspection region of an outer circumferential surface of the honeycomb body;
    a sensor that directly measures circumferential travel along a circumference of the outer circumferential surface of the honeycomb body when the honeycomb body is rotated by the plurality of rollers, the sensor configured to trigger the camera to collect an image of the inspection region of the honeycomb body at a predetermined distance of the circumferential travel along the circumference of the outer circumferential surface based at least in part on direct measurements of the circumferential travel of the outer circumferential surface; and
    a light source having an illumination area that encompasses the inspection region of the outer circumferential surface of the honeycomb body.

2. The apparatus of claim 1, wherein an angle between an illumination axis of the light source and an optical axis of the camera is less than or equal to 15°.

3. The apparatus of claim 2, wherein the light source comprises a plurality of light sources and the angle between the illumination axis of each of the plurality of light sources and the optical axis of the camera is less than or equal to 15°.

4. The apparatus of claim 3, wherein the plurality of light sources has a combined intensity of at least two million lux.

5. The apparatus of claim 1, wherein the camera has a depth of field that is centered on the outer circumferential surface of the honeycomb body so that the depth of field extends approximately 5 mm outward and 5 mm inward from the outer circumferential surface of the honeycomb body at a center of the inspection region.

6. The apparatus of claim 1, wherein the sensor is an encoder having a measurement resolution of less than or equal to 0.2 μm.

7. The apparatus of claim 1, wherein the camera comprises a plurality of cameras.

8. The apparatus of claim 7, wherein the plurality of cameras is distributed around the circumference of the honeycomb body, the field of view of each camera of the plurality of cameras comprises a length measured parallel to the axis of rotation that is greater than or equal to a full length of the honeycomb body.

9. The apparatus of claim 7, wherein the plurality of cameras is distributed parallel to the axis of rotation, the plurality of cameras having a combined field of view having a combined length measured parallel to the axis of rotation that is greater than or equal to a full length of the honeycomb body.

10. The apparatus of claim 1, wherein the field of view comprises a length measured parallel to the axis of rotation that is greater than or equal to a full length of the honeycomb body measured parallel to the axis of rotation.

11. The apparatus of claim 1, further comprising a distance sensor configured to determine a distance between the camera and the honeycomb body in a direction parallel to an optical axis of the camera.

12. The apparatus of claim 1, further comprising a robotic loading mechanism configured to place the honeycomb body on the actuator.

13. The apparatus of claim 1, further comprising a control unit coupled with the camera, the control unit configured to analyze the image using one or more algorithms to identify one or more surface defects.

14. The apparatus of claim 13, further comprising a rejection actuator comprising a movable body that is configured to translate in a direction toward the honeycomb body for moving the honeycomb body to a rejection receptacle based at least in part on a number of identified surface defects being greater than or equal to a predefined threshold.

15. The apparatus of claim 13, further comprising a marking device comprising an ink and configured to apply an indicium to a surface of the honeycomb body based at least in part on a number of identified surface defects being less than a predefined threshold.

16. The apparatus of claim 1, wherein the actuator is spaced from a portion of an intersection between an end face of the honeycomb body and the outer circumferential surface of the honeycomb body in the inspection region.

17. A method of inspecting an outer circumferential surface of a honeycomb body, comprising:
continuously rotating the honeycomb body via an actuator engaged with the outer circumferential surface of the honeycomb body;
measuring circumferential travel along a circumference of the outer circumferential surface of the honeycomb body;
triggering, based at least in part on direct measurement of the circumferential travel of the outer circumferential surface, a camera to collect a plurality of images of the outer circumferential surface of the honeycomb body, the plurality of images collected at predetermined distances of the circumferential travel of the outer circumferential surface over a single rotation of the honeycomb body;
combining the plurality of images into a composite image; and
analyzing the composite image to identify one or more surface defects on the outer circumferential surface of the honeycomb body.

18. The method of claim 17, further comprising rejecting the honeycomb body based at least in part on a number of identified surface defects being greater than or equal to a predefined threshold.

19. The method of claim 17, further comprising applying an indicium to a surface of the honeycomb body based at least in part on a number of identified surface defects being less than a predefined threshold.

20. The method of claim 17, wherein the actuator comprises a pair of rollers configured to receive the honeycomb body, wherein continuously rotating honeycomb body comprises rotating at least one roller to rotate the honeycomb body about a longitudinal axis of the honeycomb body due to frictional engagement between the outer circumferential surface of the honeycomb body and the at least one roller.

* * * * *